(12) United States Patent
Venkataramani et al.

(10) Patent No.: US 7,124,573 B2
(45) Date of Patent: Oct. 24, 2006

(54) ROTARY PULSE DETONATION SYSTEM WITH AERODYNAMIC DETONATION PASSAGES FOR USE IN A GAS TURBINE ENGINE

(75) Inventors: Kattalaicheri Srinivasan Venkataramani, West Chester, OH (US); Lawrence Butler, Solihull (GB); Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 353 days.

(21) Appl. No.: 10/803,293

(22) Filed: Mar. 18, 2004

(65) Prior Publication Data

US 2006/0207261 A1 Sep. 21, 2006

(51) Int. Cl.
*F02C 5/04* (2006.01)
*F02K 7/02* (2006.01)
(52) U.S. Cl. .................. 60/247; 60/39.39; 60/39.78
(58) Field of Classification Search ............ 60/39.35, 60/39.38, 39.39, 39.76, 39.78, 247
See application file for complete search history.

(56) References Cited

U.S. PATENT DOCUMENTS

| | | | |
|---|---|---|---|
| 5,345,758 A | 9/1994 | Bussing | 60/39.38 |
| 5,901,550 A | 5/1999 | Bussing et al. | 60/39.38 |
| 6,349,538 B1 | 2/2002 | Hunter, Jr. et al. | 60/204 |
| 6,505,462 B1 | 1/2003 | Meholic | 60/39.39 |
| 2004/0172950 A1* | 9/2004 | Venkataramani et al. | 60/776 |
| 2004/0261396 A1* | 12/2004 | Sammann et al. | 60/226.1 |
| 2005/0000205 A1* | 1/2005 | Sammann et al. | 60/226.1 |
| 2005/0028531 A1* | 2/2005 | Venkataramani et al. | 60/776 |

* cited by examiner

*Primary Examiner*—Louis J. Casaregola
(74) *Attorney, Agent, or Firm*—William Scott Andes; James P. Davidson, Esq.

(57) ABSTRACT

A pulse detonation system for a gas turbine engine having a longitudinal centerline axis extending therethrough. The pulse detonation system includes a rotatable cylindrical member having a forward surface, an aft surface, and an outer circumferential surface, where at least one stage of circumferentially spaced detonation passages are disposed therethrough. Each detonation passage further includes: a leading portion positioned adjacent the forward surface of the cylindrical member, with the leading portion having a centerline therethrough oriented at a designated angle to an axis extending substantially parallel to the longitudinal centerline axis within a specified plane; a trailing portion positioned adjacent the aft surface of the cylindrical member, with the trailing portion having a centerline therethrough oriented at a designated angle to the axis within the specified plane; and, a middle portion connecting the leading and trailing portions, with the middle portion having a centerline therethrough with a substantially constantly changing slope in the specified plane. A shaft is rotatably connected to the cylindrical member and a stator is configured in spaced arrangement with the forward surface of the cylindrical member and a portion of the shaft. The stator further includes at least one group of ports formed therein alignable with the leading portions of the detonation passages as the cylindrical member rotates. In this way, detonation cycles are performed in the detonation passages so that combustion gases interact therewith to create a torque which causes the cylindrical member to rotate.

31 Claims, 12 Drawing Sheets

ROTARY PULSE DETONATION SYSTEM WITH AERODYNAMIC DETONATION PASSAGES FOR USE IN A GAS TURBINE ENGINE

BACKGROUND OF THE INVENTION

The present invention relates generally to a pulse detonation system for a gas turbine engine and, in particular, to a pulse detonation system which is able to replace the core of a gas turbine engine without use of an externally actuated valve system.

It is well known that typical gas turbine engines are based on the ideal Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such gas turbine engines generally rely upon deflagrative combustion to burn a fuel/air mixture and produce combustion gas products which travel at relatively slow rates and relatively constant pressure within a combustion chamber. While engines based on the Brayton Cycle have reached a high level of thermodynamic efficiency by steady improvements in component efficiencies and increases in pressure ratio and peak temperature, further improvements are becoming increasingly costly to obtain.

Accordingly, improvements in engine efficiency have been obtained by operating the engine so that the combustion occurs as a detonation in either a continuous or pulsed mode. Most pulse detonation devices employ detonation tubes that are fed with a fuel/air mixture that is subsequently ignited. A combustion pressure wave is then produced, which transitions into a detonation wave (i.e., a fast moving shock wave closely coupled to the reaction zone). The products of combustion follow the detonation wave and are propagated at the speed of sound relative to the detonation wave while simultaneously providing a significant pressure rise. Such combustion products then exit through a nozzle to produce thrust. Examples of a pulse detonation engine are disclosed in U.S. Pat. Nos. 5,345,758 to Bussing and 5,901,550 to Bussing et al.

Simple pulse detonation engines have no moving parts with the exception of various forms of externally actuated valves. Such valves are used to control the duration of the fuel/air introduction and to prevent backflow of combustion products during the detonation process. An example of a rotary valve utilized for pulse detonation engines is disclosed in U.S. Pat. No. 6,505,462 to Meholic. While such pulse detonation configurations have advanced the state of the art, the valves and associated actuators are subjected to very high temperatures and pressures. This not only presents a reliability problem, but can also have a detrimental effect on the turbomachinery of the engine.

One type of pulse detonation system which has eliminated the need for a separate valve is disclosed in a patent application entitled "Pulse Detonation Device For A Gas Turbine Engine," having Ser. No. 10/383,027 and being owned by the assignee of the present invention. It will be noted therein that the pulse detonation device includes a stationary air inlet duct and a ring member which rotates therearound. The various events of the detonation take place within detonation ducts associated with the ring member, as air and fuel are injected and a detonation wave is initiated therein. In this configuration, the aft portion of the rotatable ring member is connected to a drive shaft in a cantilevered manner. The air ports, fuel injectors and initiation devices are located adjacent an outer surface of the air inlet duct so as to be sequentially aligned with an inner end of the detonation ducts, which are open at each end, as the ring member rotates.

A second type of pulse detonation system is disclosed in a patent application entitled "Pulse Detonation System For A Gas Turbine Engine," having Ser. No. 10/405,561 and being owned by the assignee of the present invention. It will be seen therein that the pulse detonation system includes a rotatable cylindrical member having a plurality of spaced detonation chambers disposed therein. A stator is configured in spaced arrangement around the forward surface, the aft surface, and the outer circumferential surface of the cylindrical member and a drive shaft connected thereto. The stator has a group of ports formed therein which are in flow communication with the detonation chambers from a position adjacent the outer circumferential surface of the cylindrical member. Detonation cycles are performed in the detonation chambers so that reaction forces induced by the detonation cycles create a torque which causes the cylindrical member to rotate. Each detonation chamber includes a first open end located adjacent the outer circumferential surface of the cylindrical member and a second closed end located within a middle portion of the cylindrical member.

Another pulse detonation system owned by the assignee of the present invention is disclosed in a patent application entitled "Integral Pulse Detonation System For A Gas Turbine Engine" having Ser. No. 10/418,859. This system discloses a rotatable cylindrical member having a forward surface, an aft surface, and an outer circumferential surface, where at least one stage of spaced detonation passages are disposed therethrough. In particular, each detonation passage includes a first portion extending from the cylindrical member forward surface to a middle portion of the cylindrical member and a second portion extending from the first portion to the outer circumferential surface of the cylindrical member. The pulse detonation system further includes a shaft rotatably connected to the cylindrical member and a stator configured in spaced arrangement with the forward surface of the cylindrical member and a portion of the shaft. The stator has at least one group of ports formed therein alignable with the detonation passages as the cylindrical member rotates. In this way, detonation cycles are performed in the detonation passages so that combustion gases exit the cylindrical manner in a substantially tangential direction with respect to the outer circumferential surface to create a torque which causes the cylindrical member to rotate. While the configuration disclosed in this patent application is useful for its intended purpose, it is understood that adequate turning of the air and combustion gases exiting the detonation passages is required.

Yet another pulse detonation system owned by the assignee of the present invention is disclosed in a patent application entitled "Rotating Pulse Detonation System For A Gas Turbine Engine" having Ser. No. 10/422,314. This system discloses a rotatable cylindrical member having a forward surface, an aft surface, and an outer circumferential surface, where a plurality of spaced detonation passages are disposed therethrough. In particular, each detonation passage includes at least a portion thereof with a longitudinal axis extending therethrough oriented at a circumferential angle to a longitudinal centerline axis through the gas turbine engine. The pulse detonation system also includes a shaft rotatably connected to the cylindrical member and a stator is configured in spaced arrangement with the forward surface of the cylindrical member and a portion of the shaft. The stator further includes at least one group of ports formed therein alignable with the detonation passages as the cylindrical member rotates. In this way, detonation cycles are performed in the detonation passages so that combustion gases exit the aft surface of the cylindrical member to create a torque which causes the cylindrical member to rotate. While the configuration disclosed in this patent application is useful for its intended purpose, it has been found that the abrupt change in direction of the detonation passages creates a disruption in the air flow therethrough which leads to an inefficient extraction of work.

Accordingly, it would be desirable for a pulse detonation system to be developed for a gas turbine engine which is able to operate the engine without the need for a separate valve and without causing adverse effects on the other components of the gas turbine engine. Further, it would be desirable for such pulse detonation system to be adaptable to a gas turbine engine for both aeronautical and industrial applications so as to eliminate the core (i.e., a high pressure compressor, combustor, and high pressure turbine). It is also desirable that the pulse detonation system include a rotatable cylindrical member having detonation passages formed therein which are able to promote smoother air flow therethrough and provide a more efficient extraction of work.

BRIEF SUMMARY OF THE INVENTION

In a first exemplary embodiment of the invention, a pulse detonation system for a gas turbine engine is disclosed as having a longitudinal centerline axis extending therethrough. The pulse detonation system includes a rotatable cylindrical member having a forward surface, an aft surface, and an outer circumferential surface, where at least one stage of circumferentially spaced detonation passages are disposed therethrough. Each detonation passage further includes: a leading portion positioned adjacent the forward surface of the cylindrical member, with the leading portion having a centerline therethrough oriented at a designated angle to an axis extending substantially parallel to the longitudinal centerline axis within a specified plane; a trailing portion positioned adjacent the aft surface of the cylindrical member, with the trailing portion having a centerline therethrough oriented at a designated angle to the axis within the specified plane; and, a middle portion connecting the leading and trailing portions, with the middle portion having a centerline therethrough with a substantially constantly changing slope in the specified plane. A shaft is rotatably connected to the cylindrical member and a stator is configured in spaced arrangement with the forward surface of the cylindrical member and a portion of the shaft. The stator further includes at least one group of ports formed therein alignable with the leading portions of the detonation passages as the cylindrical member rotates. In this way, detonation cycles are performed in the detonation passages so that combustion gases interact therewith to create a torque which causes the cylindrical member to rotate.

In a second exemplary embodiment of the invention, a method of providing power to a drive shaft in a gas turbine engine is disclosed as including the following steps: providing a rotatable cylindrical member having a plurality of spaced detonation passages disposed therethrough; forming the detonation passages in the rotatable cylindrical member so that a middle portion thereof has a centerline therethrough with a substantially constantly changing slope in a specified plane; providing a stator in spaced relation to a forward surface of the cylindrical member, where the stator has at least one group of ports formed therein; connecting the cylindrical member to a drive shaft; performing a detonation cycle in each detonation passage; and, producing a torque on the cylindrical member via the interaction of combustion gases with the detonation passages which causes the cylindrical member and the drive shaft to rotate.

In accordance with a third embodiment of the invention, a gas turbine engine is disclosed as including: a fan section at a forward end of the gas turbine engine including at least a first fan blade row connected to a drive shaft; a booster compressor positioned downstream of the fan section, where the booster compressor includes a first compressor blade row and a second compressor blade row connected to the drive shaft and interdigitated with the first compressor blade row; and, a pulse detonation system for powering the drive shaft. The pulse detonation system further includes a rotatable cylindrical member having a forward surface, an aft surface, and an outer circumferential surface, where the cylindrical member includes at least one detonation stage having a plurality of spaced detonation passages disposed therethrough and is connected to the drive shaft. Each detonation passage includes: a leading portion positioned adjacent the forward surface of the cylindrical member, where the leading portion has a centerline therethrough oriented at a designated angle to an axis extending substantially parallel to the longitudinal centerline axis within a specified plane; a trailing portion positioned adjacent the aft surface of the cylindrical member, where the trailing portion has a centerline therethrough oriented at a designated angle to the axis within the specified plane; and, a middle portion connecting the leading and trailing portions, where the middle portion has a centerline therethrough with a substantially constantly changing slope in the specified plane. A stator is also configured in spaced arrangement with the forward surface of the cylindrical member and a portion of the shaft, with the stator including at least one group of ports formed therein alignable with the leading portion of the detonation passages as the cylindrical member rotates. In this way, detonation cycles are performed in the detonation passages so that combustion gases interface therewith to create a torque which causes the cylindrical member to rotate and power the fan section and the booster compressor.

In accordance with a fourth embodiment of the present invention, a gas turbine engine is disclosed as including: a bellmouth at a forward end of the gas turbine engine; a compressor positioned downstream of and in flow communication with the bellmouth, where the compressor includes a first compressor blade row and a second blade row connected to a drive shaft and interdigitated with the first compressor blade row; a load connected to the drive shaft; and, a pulse detonation system for powering the drive shaft. The pulse detonation system further includes a rotatable cylindrical member having a forward surface, an aft surface, and an outer circumferential surface, where the cylindrical member includes at least one detonation stage having a plurality of detonation passages disposed therein and being connected to the drive shaft. Each detonation passage further includes: a leading portion positioned adjacent the forward surface of the cylindrical member, with the leading portion having a centerline therethrough oriented at a designated angle to an axis extending substantially parallel to the longitudinal centerline axis within a specified plane; a trailing portion positioned adjacent the aft surface of the cylindrical member, with the trailing portion having a centerline therethrough oriented at a designated angle to the axis within the specified plane; and, a middle portion connecting the leading and trailing portions, with the middle portion having a centerline therethrough with a substantially constantly changing slope in the specified plane. A stator is configured in spaced arrangement to the forward surface of the cylindrical member and a portion of the shaft, with the stator including at least one group of ports formed therein alignable with the leading portion of the detonation passages as the cylindrical member rotates. In this way, detonation cycles are performed in the detonation passages so that combustion gases interface therewith to create a torque which causes the cylindrical member to rotate and power the compressor and the load.

DETAILED DESCRIPTION OF THE INVENTION

Figure 1:
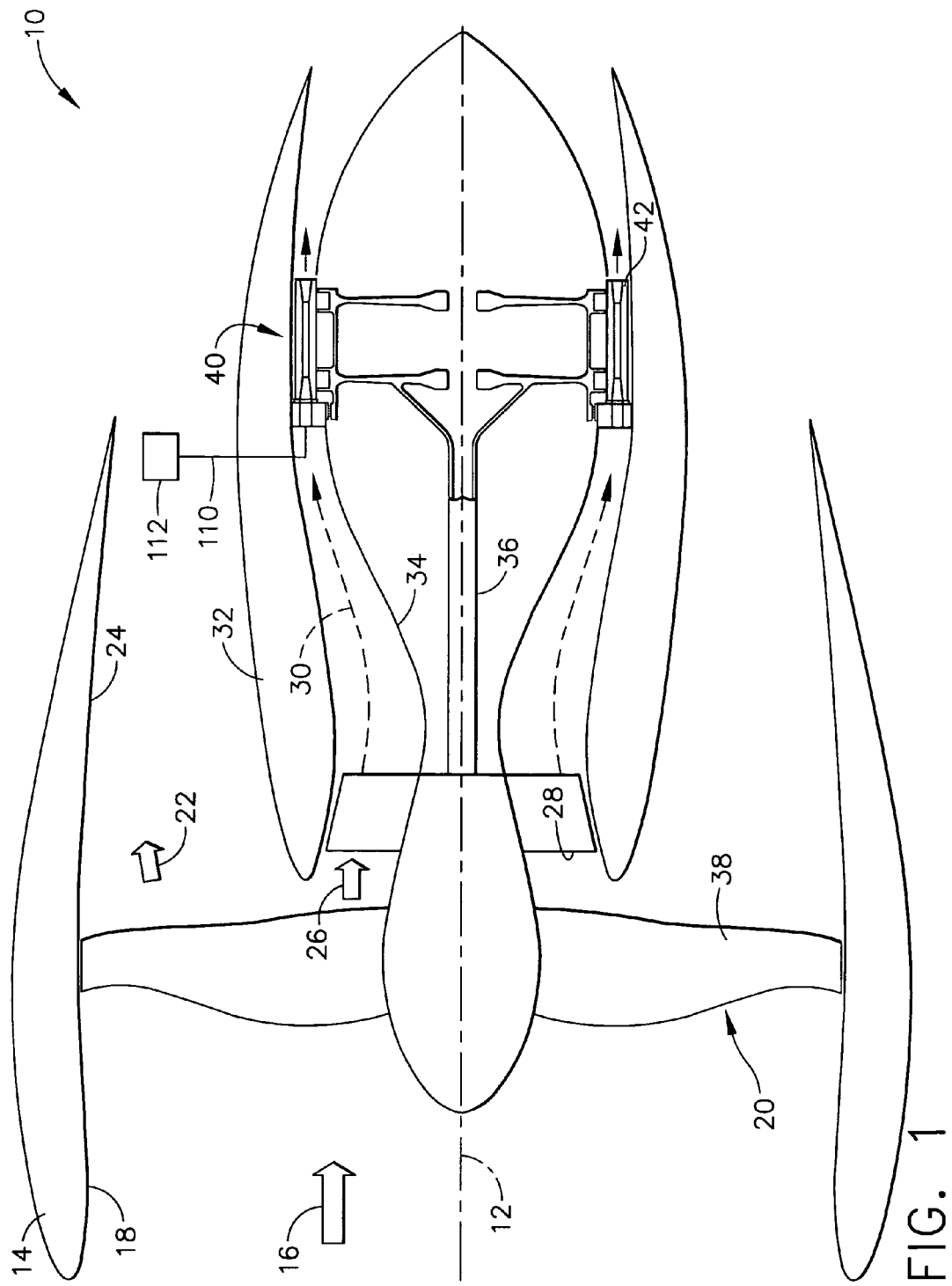
FIG. 1 is a longitudinal schematic sectional view of a gas turbine engine configuration including a pulse detonation system in accordance with the present invention.

Referring now to the drawings in detail, wherein identical numerals indicate the same elements throughout the figures, FIG. 1 schematically depicts an exemplary gas turbine engine 10 (high bypass type) utilized with aircraft having a longitudinal or axial centerline axis 12 therethrough for reference purposes. Gas turbine engine 10 includes a nacelle 14 to assist in directing a flow of air (represented by arrow 16) through an inlet 18 to a fan section 20 as is well known. Air flow 16 is then split downstream of fan section 20 so that a first portion (represented by arrow 22) flows through an outer duct 24 and a second portion (represented by arrow 26) is provided to a booster compressor 28.

In the high bypass configuration depicted, it will be understood that booster compressor 28 preferably provides a compressed air flow 30 which is bounded by an inner bypass platform 32 and a gooseneck inner flow path 34. It will be noted that booster compressor 28 preferably includes at least one compressor stage with a stationary compressor blade row and a compressor blade row connected to a drive shaft 36 and interdigitated with the stationary compressor blade row associated with each compressor stage. It will be appreciated that additional booster compressor stages may be provided as desired. A first fan blade row 38 is also preferably connected to drive shaft 36.

Drive shaft 36 is preferably powered by means of a pulse detonation system 40 in accordance with the present invention. More specifically, pulse detonation system 40 includes a rotatable cylindrical member 42 having a forward surface 44, an aft surface 46, and an outer circumferential surface 48. The direction of rotation for cylindrical member 42 is represented by arrow 43 as shown in FIG. 4. While cylindrical member 42 may include an integral middle portion, it will be seen in FIGS. 2 and 3 that at least one separate disk member 50 is preferably provided to connect cylindrical member 42 with drive shaft 36. This helps to reduce the overall weight of cylindrical member 42. One or more additional disk members 51 may be connected to disk member 50 to provide additional support depending on the axial length of cylindrical member 42, the axial length of disk member 50, and the position of disk member 50 with respect to cylindrical member 42.

In order to attach cylindrical member 42 and disk members 50 and 51, it is preferred that cylindrical member 42 include a plurality of circumferentially spaced dovetail members 53 and 55 which mate with a like number of dovetail slots 57 and 59, respectively, formed in disk members 50 and 51. It will be appreciated from FIG. 3 that cylindrical member 42 is preferably formed by a plurality of annular segments 61 which include dovetail members 53 and 55. Such annular members 61 generally will include at least one detonation passage 52 therein depending on the circumferential spacing between detonation passages and the arcuate length of annular segments 61. It will be recognized, however, that not every annular segment 61 need include such a detonation passage, such as with respect to the circumferential spacing between groups of ports as described herein. In any event, assembly and disassembly of cylindrical member 42 is simplified, with maintenance or replacement of only affected areas being required.

Cylindrical member 42 further includes a plurality of detonation passages 52 disposed therethrough. As best shown in FIG. 4, each detonation passage 52 is formed to include a leading portion 54 positioned at an upstream end adjacent forward surface 44 of cylindrical member 42, a trailing portion 56 positioned at a downstream end adjacent aft surface 46 of cylindrical member 42, and a middle portion 58 connecting leading portion 54 and trailing portion 56. It will be appreciated that a phantom line 63 is depicted to generally define the transition between leading portion 54 and middle portion 58, while a phantom line 65 is similarly depicted to generally define the transition between middle portion 58 and trailing portion 56.

In order to better define the orientation of detonation passages 52 within cylindrical member 42, it will be noted in FIGS. 2–5 that a coordinate system has been devised where a first axis 77 is defined as extending substantially parallel to longitudinal centerline axis 12, a second axis 79 is defined as extending substantially radially through cylindrical member 42 and substantially perpendicular to axis 77, and a third axis 81 is defined as extending substantially parallel to a tangent 83 of a circumference for said cylindrical member 42 and substantially perpendicular to axis 77. It will be appreciated for purposes of this description that second axis 79 is preferably located so as to extend through middle portion 58 of any detonation passage and third axis 81 is preferably located substantially parallel to a tangent of cylindrical member 42 which is substantially perpendicular to any particular second axis 79. Having defined such coordinate system, it follows that first and third axes 77 and 81 define a first plane 85 which extends through cylindrical member 42 that will be known herein as a tangential plane. First and second axes 77 and 79 define a second plane 87 which extends through cylindrical member 42 that will be known herein as a radial plane.

Figure 2:
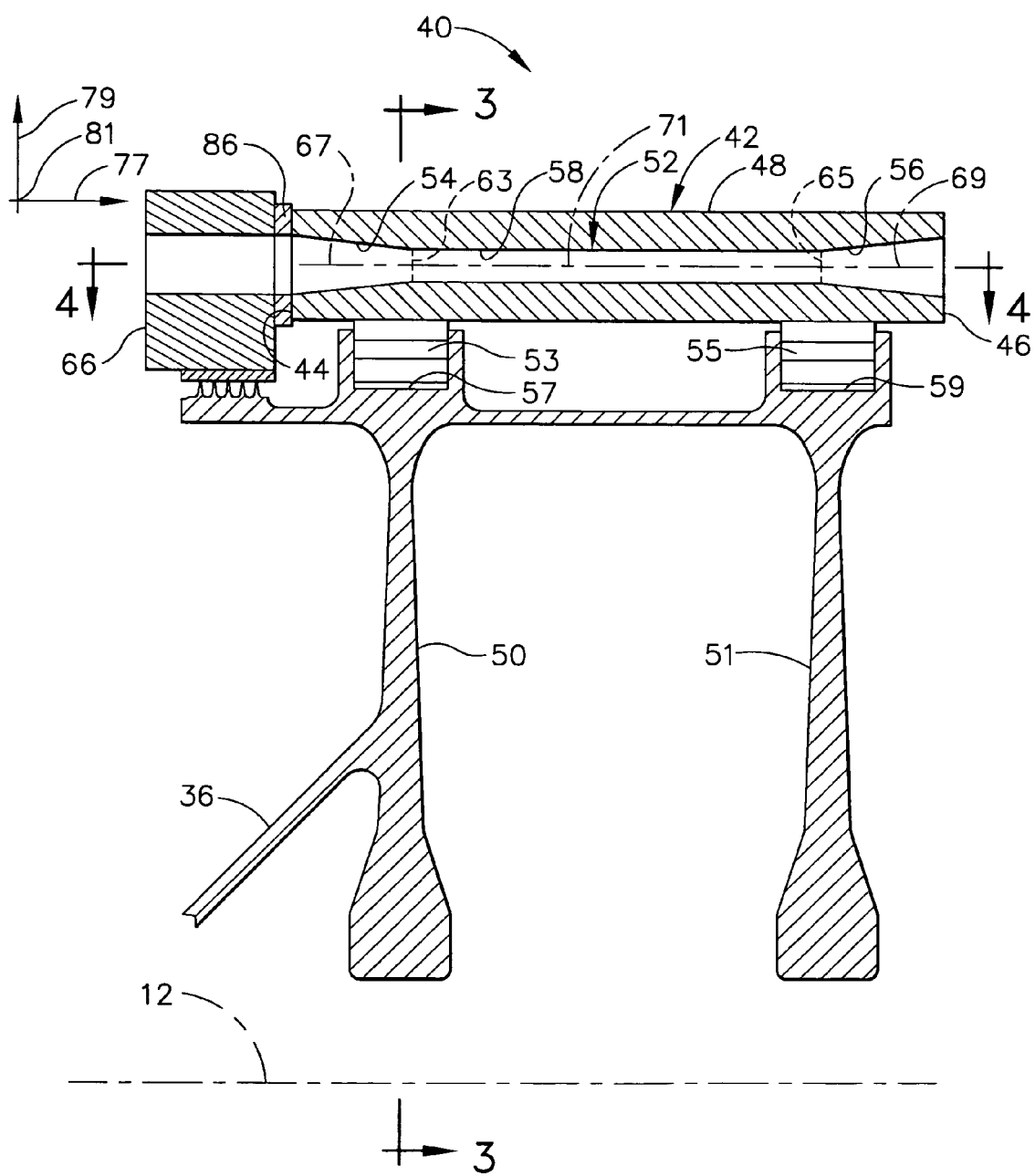
FIG. 2 is an enlarged, partial longitudinal schematic sectional view of the gas turbine engine depicted in FIG. 1.
Figure 3:
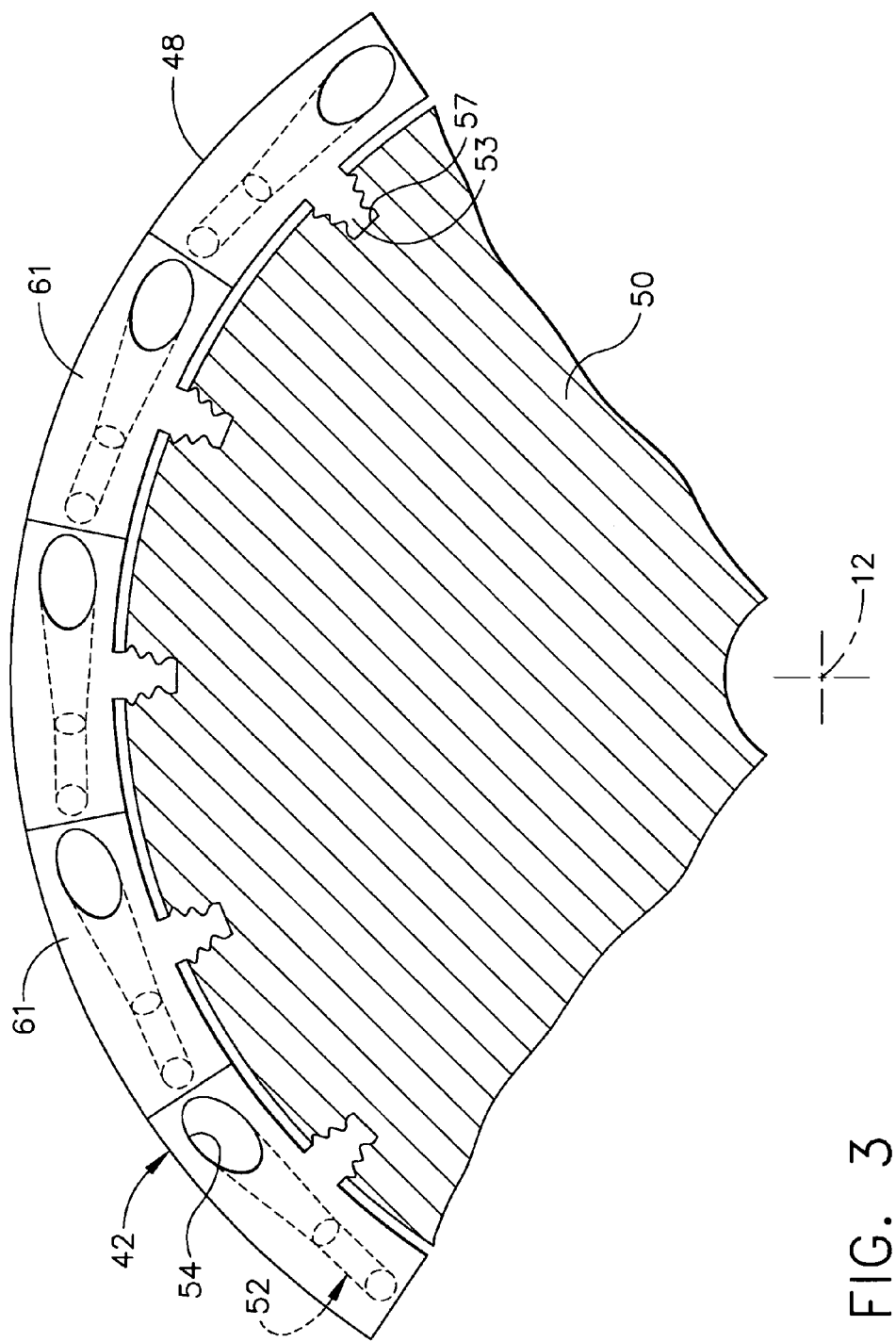
FIG. 3 is a partial front sectional view of the pulse detonation system taken along line 3—3 in FIG. 2, where the cylindrical member has not been sectioned for clarity.
Figure 4:
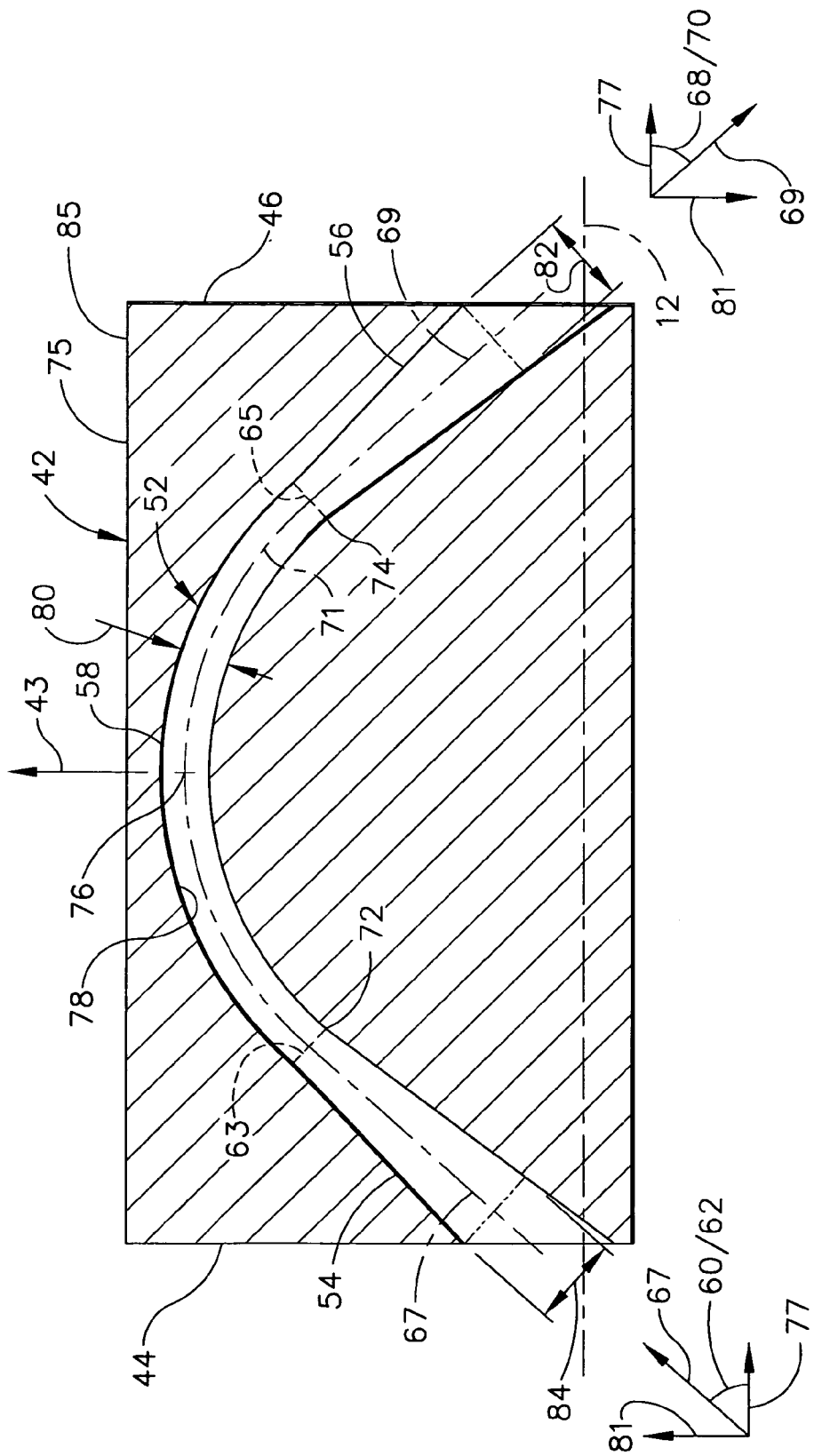
FIG. 4 is an enlarged diagrammatic view of a detonation passage for the pulse detonation system taken along line 4—4 in FIG. 2.
Figure 5:
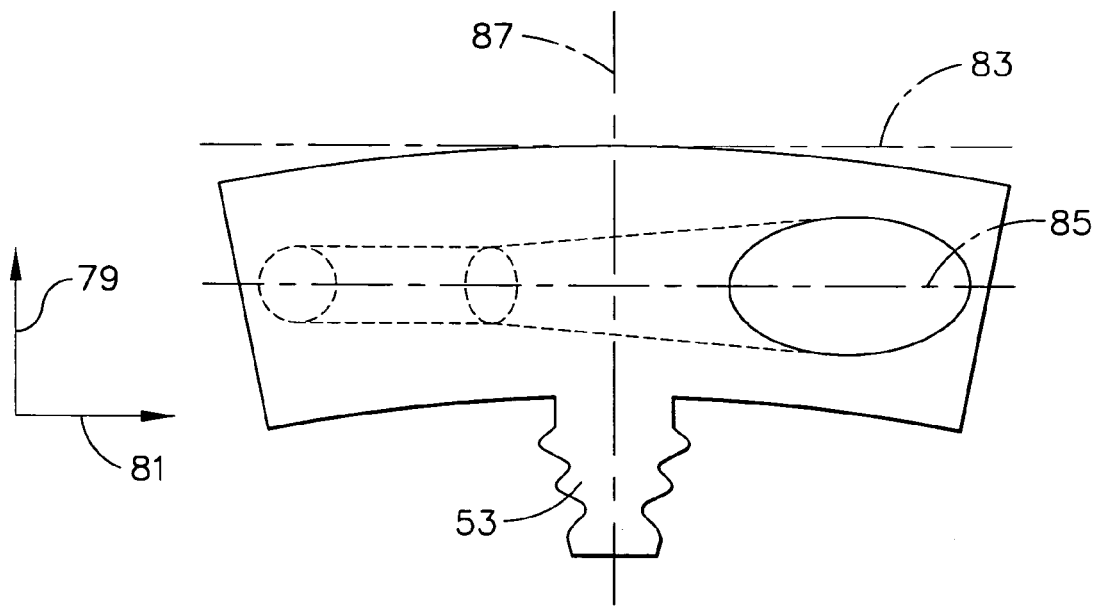
FIG. 5 is an enlarged partial front view of the cylindrical member depicted in FIG. 3.

It will be seen from FIGS. 2–5 with respect to detonation passage 52 that leading portion 54 is configured so that a centerline 67 therethrough is preferably oriented at a designated angle 60 to axis 77 within a specified plane 75 extending through detonation passage 52. As shown in FIGS. 2 and 3, specified plane 75 is oriented so as to lie substantially within tangential plane 85 so that designated angle 60 between centerline 67 and axis 77 has only a tangential component 62 thereto (as identified in FIG. 4). A preferred range for the tangential component of designated angle 60 is approximately 20–75°, a more preferred range is approximately 30–70°, and an optimal range is approximately 45–65°.

Figure 6:
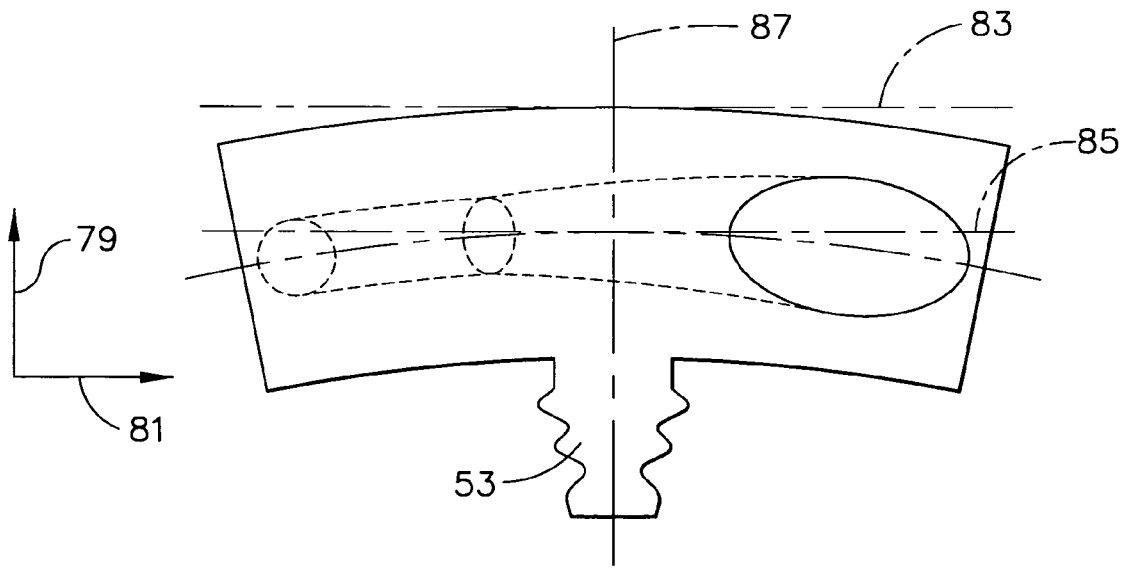
FIG. 6 is an enlarged partial front view of a cylindrical member similar to that in FIG. 5, where an alternative orientation for a detonation passage therein is shown.
Figure 7:
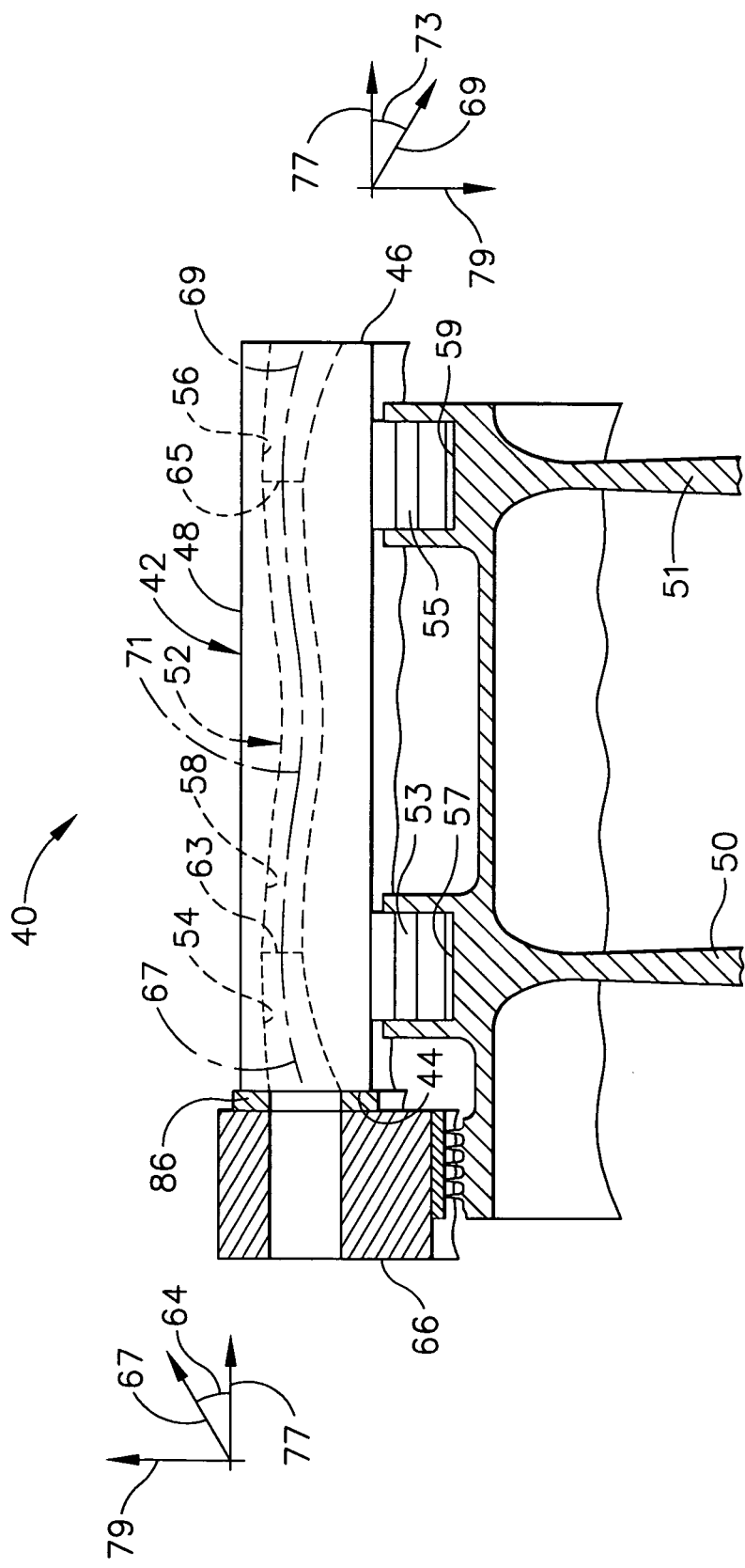
FIG. 7 is an enlarged partial longitudinal sectional view of the cylindrical member depicted in FIG. 6.

It will be appreciated that specified plane 75 through detonation passage 52 may also be oriented so as to have a radial component as well. As depicted in FIGS. 6 and 7, centerline 67 of leading portion 54 is oriented so that designated angle 60 with respect to axis 77 has both tangential component 62 (shown in FIG. 4) and a radial component 64 (shown in FIG. 7). While the tangential component of designated angle 60 preferably lies within the range of angles specified above, radial component 64 thereof is preferably in a range of approximately 0° to 60°, a more preferred range of approximately 0° to 45°, and an optimal range of approximately 0° to 30°.

Regardless of whether designated angle 60 has a radial component or not, it will be appreciated that the orientation of leading portion 54 is such that centerline 67 is substantially alignable with the flow emanating from a group of ports in a stator 66 as described more specifically herein. It will be appreciated, however, that the optimal angular orientation of leading portion 54 for detonation passages 52 is preferably determined by an analysis of the velocity vectors for inlet air and fuel supplied by the group of ports in light of the rotational velocity of cylindrical member 42 over a range of operating conditions for the engine.

It will further be noted that a centerline 69 for trailing portion 56 of each detonation passage 52 is also preferably oriented at a designated angle 68 to axis 77 within specified plane 75. As explained in the '314 patent application, this permits the combustion gases to exit aft surface 46 of cylindrical member 42 in a manner to create a torque which causes cylindrical member 42 to rotate. As evidenced by the figures, detonation passages 52 are preferably symmetrical so that leading portion 54 and trailing portion 56 are oriented in opposite directions where designated angles 60 and 68 have substantially the same magnitude but on opposite sides of axis 77. It is understood, however, that the magnitude of such respective angles may be different and need not be substantially the same.

Thus, the detonation passage 52 depicted in FIGS. 2 and 3 has a designated angle 68 which includes only a tangential component 70 (as identified in FIG. 4) since centerline 69 is substantially parallel to axis 77. A preferred range for designated angle 68 is approximately −20° to −75°, a more preferred range is approximately −30° to −70°, and an optimal range is approximately −45° to −65° with respect to axis 77. In the case where specified plane 75 includes a radial component (see FIG. 7), centerline 69 of trailing portion 56 is oriented so that designated angle 68 with respect to axis 77 has both tangential component 70 and a radial component 73. While tangential component 70 of designated angle 68 preferably lies within the range of angles previously specified, radial component 73 is preferably in a range of approximately 0° to −60°, a more preferred range of approximately 0° to −45°, and an optimal range of approximately 0° to −30°.

Each detonation passage 52 preferably has a substantially circular cross-section throughout the length of at least a portion thereof, although such cross-section may also be non-circular. It will be appreciated that a diameter 80 of detonation passages 52 may be substantially constant, or as depicted in FIG. 4 with respect to trailing portion 56, such detonation passages may have a diverging cross-section so as to have an increasing diameter from diameter 80 at phantom line 65 to a maximum diameter 82 at aft surface 46 of cylindrical member 42. It will also be noted that leading portion 54 may have a converging cross-sectional area so that its diameter 84 at forward surface 44 of cylindrical member 42 is greater than diameter 80 at phantom line 63. In this way, flow through and pressure within detonation passages 52 may be controlled for their desirable effects.

It will further be seen that middle portion 58 of each detonation passage 52 is configured to have a substantially constantly changing slope within specified plane 75 as it connects leading and trailing portions 54 and 56, respectively. As seen in FIG. 4, middle portion 58 is configured so that a centerline 71 therethrough is aligned with centerline 67 of leading portion 54 at a first end 72. Similarly, middle portion 58 is configured so that centerline 71 is aligned with centerline 69 of trailing portion 56 at a second end 74. Since leading portion 54 and trailing portion 56 are oriented in opposite directions, middle portion 58 will include a midpoint (defined by a phantom line 76) which transitions middle portion 58 from one direction to another (i.e., where the slope thereof is zero). Depending on the particular orientations of leading portion 54 and trailing portion 56 of detonation passages 52, centerline 71 at any given location will be oriented at a positive or negative angle with respect to axis 77. The range of slope for middle portion 58 will likewise depend upon the respective designated angles 60 and 68 of leading portion 54 and trailing portion 56, respectively.

By configuring middle portion 58 in the manner described, it will be understood that changes in pressure occur therein so that the combustion gases formed by the detonation process in each detonation passage 52 work against an inner surface 78 thereof to create a torque on cylindrical member 42 and further contribute to its rotation. Thus, the torque created to rotate cylindrical member 42 is a function of the orientation for middle portion 58, as well as the change in direction of leading portion 54 and trailing portion 56. The configuration of detonation passages 52 is therefore similar to the passages formed between adjacent blades of a turbine and functions in a similar manner. Moreover, the flow of air, fuel and combustion gases through detonation passages 52 is smooth due to the aerodynamic configuration thereof.

It is further preferred that detonation passages 52 of each detonation stage be symmetrically spaced circumferentially within cylindrical member 42. The number of detonation passages 52 provided within cylindrical member 42 is dependent upon several factors, including designated angles 62 and 68 of leading portion 54 and trailing portion 56, respectively, and a diameter of cylindrical member 42. As noted herein, it is preferred that a plurality of replaceable annular segments 61 be connected to cylindrical member 42

(e.g., via dovetail slots 57 and 59 formed in disk members 50 and 51), where each annular segment 61 typically includes at least one detonation passage 52 formed therein. Of course, detonation passages 52 may alternatively be formed in an integral cylindrical member 42.

Pulse detonation system 40 further includes a stator 66 which is configured in spaced arrangement with respect to forward surface 44 of cylindrical member 42, as well as a portion of drive shaft 36. It will be seen that stator 66 is substantially annular and a seal plate 86 is preferably positioned between forward surface 44 of cylindrical member 42 and a rear surface 88 of stator 66 so as to prevent flow between ports.

Figure 8C:
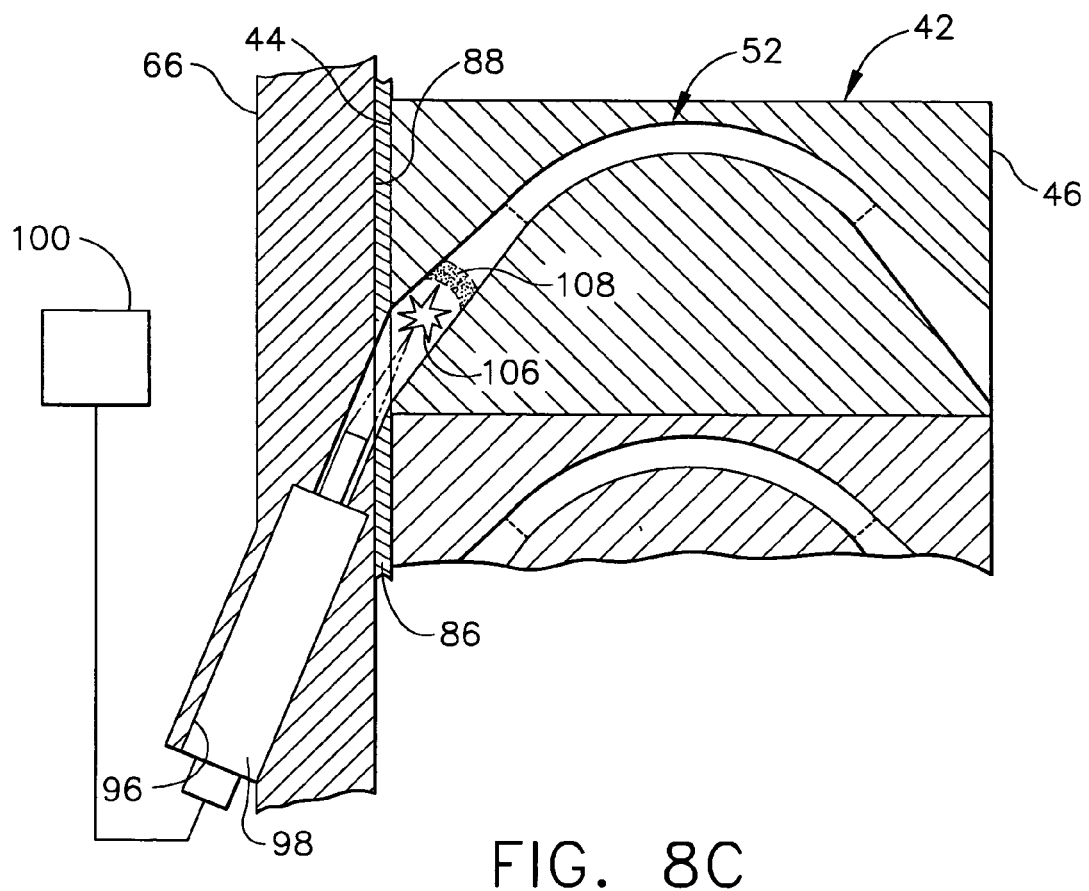
Figure 9:
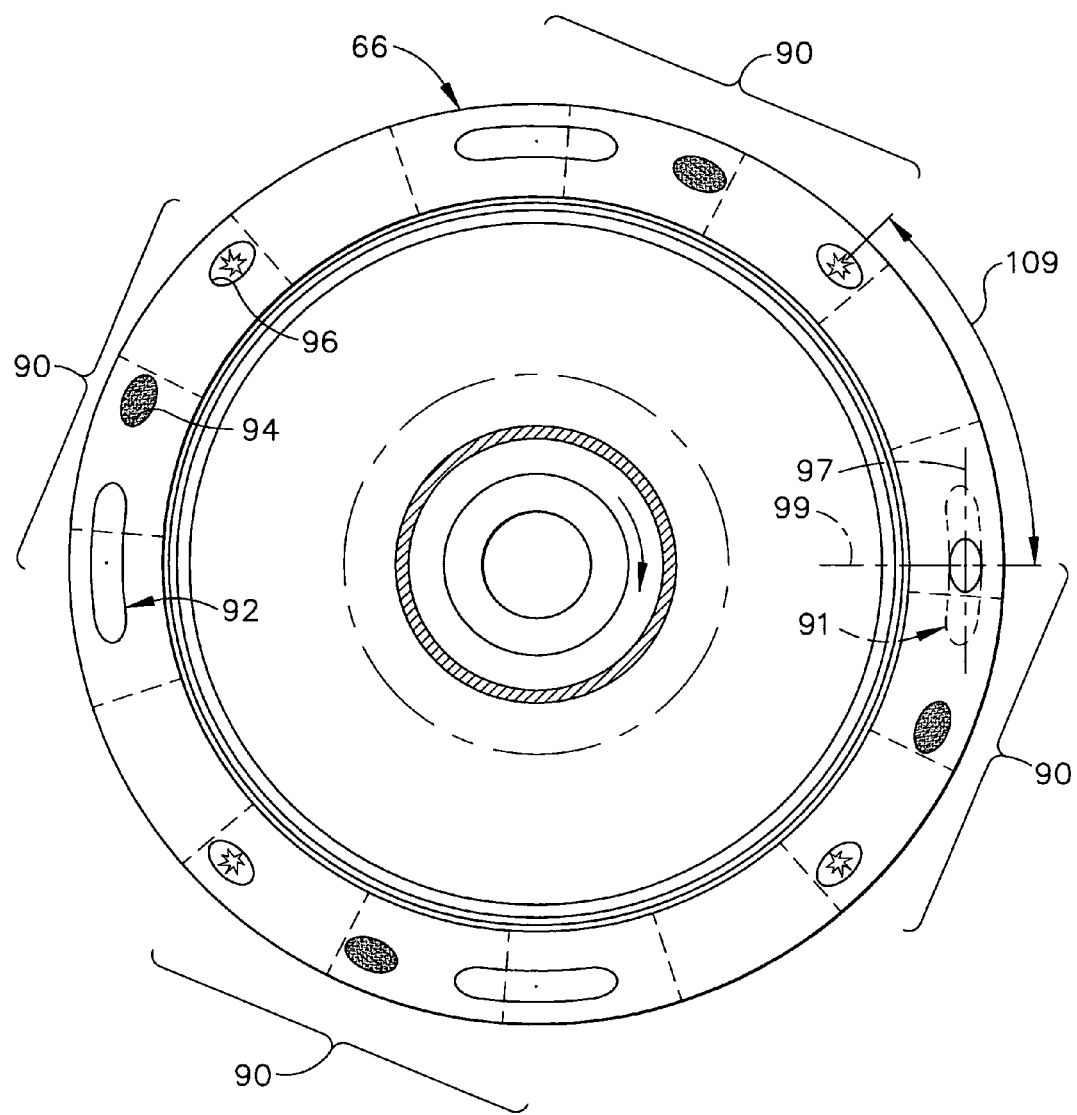
FIG. 9 is a front view of a stator for the pulse detonation system depicted in FIGS. 1, 2, and 8A–8D.

As seen in FIG. 9, stator 66 further includes at least one group of ports 90 formed therein. It will be understood that each port group 90 has an air port 92 in flow communication with a source of compressed air (e.g., compressed air flow 30 from booster compressor 28), a fuel port 94 in flow communication with a fuel source, and a port 96 having a device 98 associated therewith for initiating a detonation in detonation passages 52 (see FIG. 8C). It is contemplated that exemplary initiation devices 98 may include an igniter (e.g., a high energy spark plug, a torch igniter having separate fuel and oxidizer, or a plasma jet igniter), a laser, or a shock focus device. Initiation device 98 may be activated when port 96 is in communication with each detonation passage 52 so as to assist in producing a detonation wave in all detonation passages 52 or in accordance with a predetermined delay so that only certain detonation passages 52 are utilized for this purpose. A control device 100 is preferably provided to control the initiation of detonations within detonation passages 52.

In order to better accommodate the rotational speed of cylindrical member 42 so that air port 92 is able to interface with leading portions 54 of detonation passages 52, such ports are preferably configured so as to have an extended passage through stator 66 which extends in the circumferential direction. As viewed in a left portion of FIG. 9, ports 92 have a substantially consistent cross-section, generally are ovular or kidney shaped, and preferably extend approximately 2–4 times diameter 80 of detonation passage 52. As viewed in a right portion of FIG. 9, air port 92 has a smaller opening at the front surface of stator 66 (approximately the size of fuel port 94) and diverges therethrough to opening 91 at rear surface 88 of stator 66. It will be noted that opening 91 extends approximately 2–4 times diameter 80 of detonation passage 52 in the circumferential direction along a major axis 97 while being approximately equal to diameter 80 along a minor axis 99. With respect to fuel port 94 and initiation port 96, the openings therefor will generally be configured to the approximate size and shape of leading portions 54 of detonation passages 52.

It will further be understood that air port 92, fuel port 94 and initiation port 96 of each port group 90 are preferably oriented in stator 66 so that the velocity vectors of the fuel and air provided are aligned with leading portion 54 of each detonation passage 52 in a predetermined timing and sequence as cylindrical member 42 rotates. Accordingly, ports 92, 94 and 96 are oriented so that a centerline axis 102 through such ports is oriented in a specified direction with respect to longitudinal centerline axis 12 (see FIG. 8A). It will be understood that, depending on the orientation of leading portion 54 of detonation passages 52, the orientation of ports 92, 94 and 96 will include at least a tangential component thereto. Nevertheless, ports 92, 94 and 96 will be oriented so that centerline 102 therethrough is at a different designated angle 104 than leading portion 54 (i.e., at a mismatch) when in the static position to account for the rotation of cylindrical member 42. Openings 89 through seal plate 86 must also be oriented in a similar manner to accommodate the flow from ports 92 and 94 to leading portions 54 of detonation passages 52.

More specifically, designated angle 104 of ports 92, 94 and 96 is preferably in a range of approximately 45° to 85°, a more preferred range of approximately 55° to 80°, and an optimal range of approximately 65° to 75°. It will be understood that in each case designated angle 104 should be larger than designated angle 60. In light of the preferred ranges for designated angle 60 of leading portion 54, it will be appreciated that the difference or mismatch between designated angle 104 and designated angle 60 is approximately 10° to 65°. Because the tendency of designated angle 104 is toward the higher end of the specified ranges and the tendency of designated angle 60 is toward the lower end of its specified ranges, the difference therebetween is preferably approximately 40° to 60°.

Figure 8A:
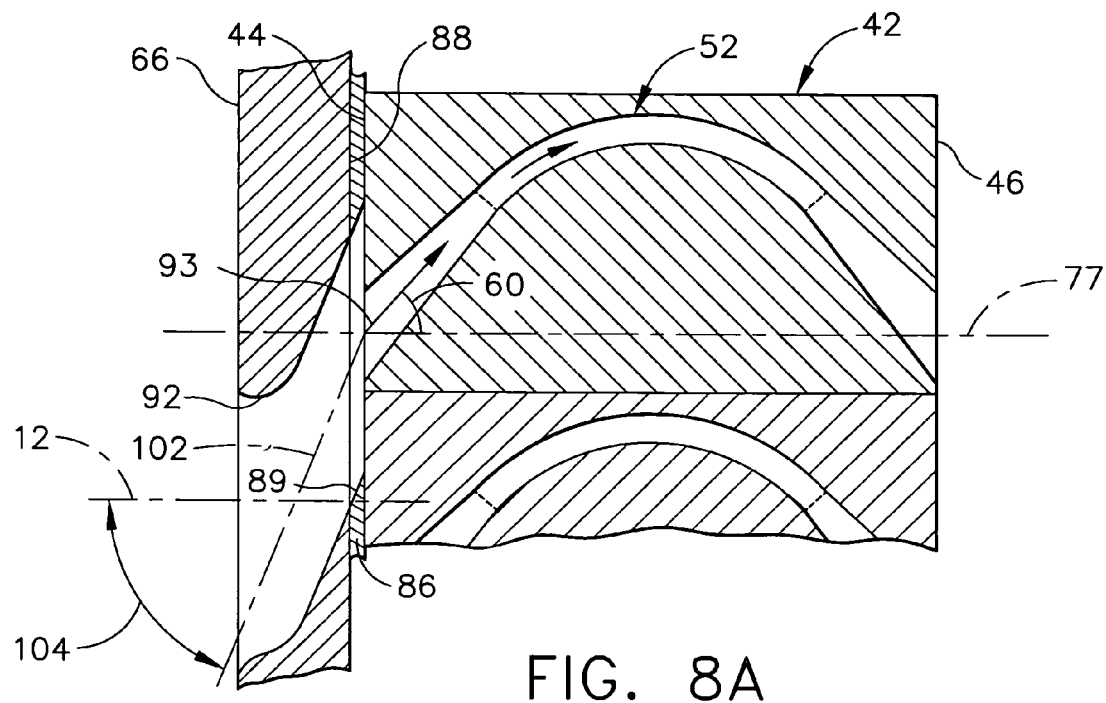
FIGS. 8A–8D are a diagrammatic view of the detonation passage for the pulse detonation system depicted in FIG. 4 undergoing a specified sequence of events in a detonation cycle.
Figure 8B:
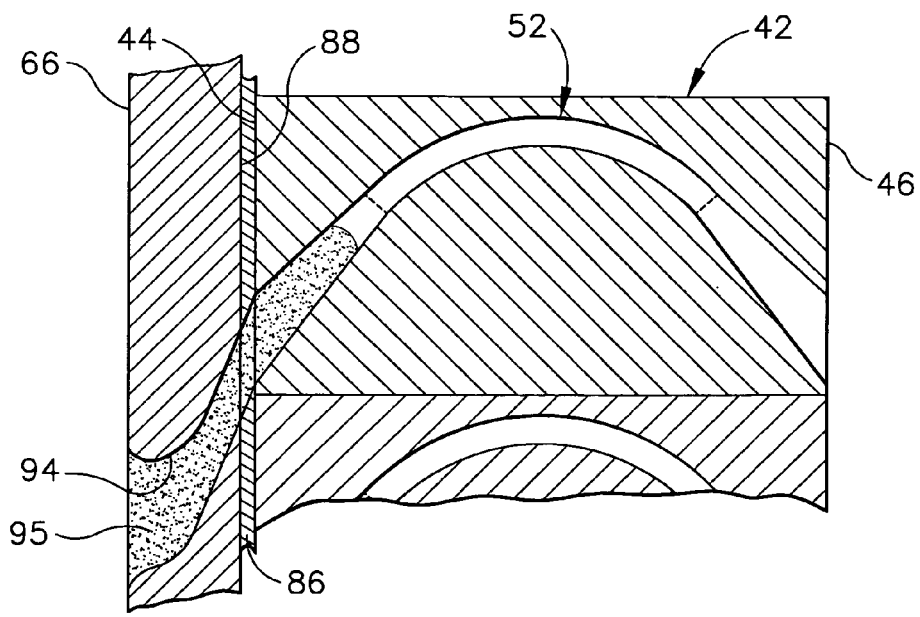
Figure 8D:
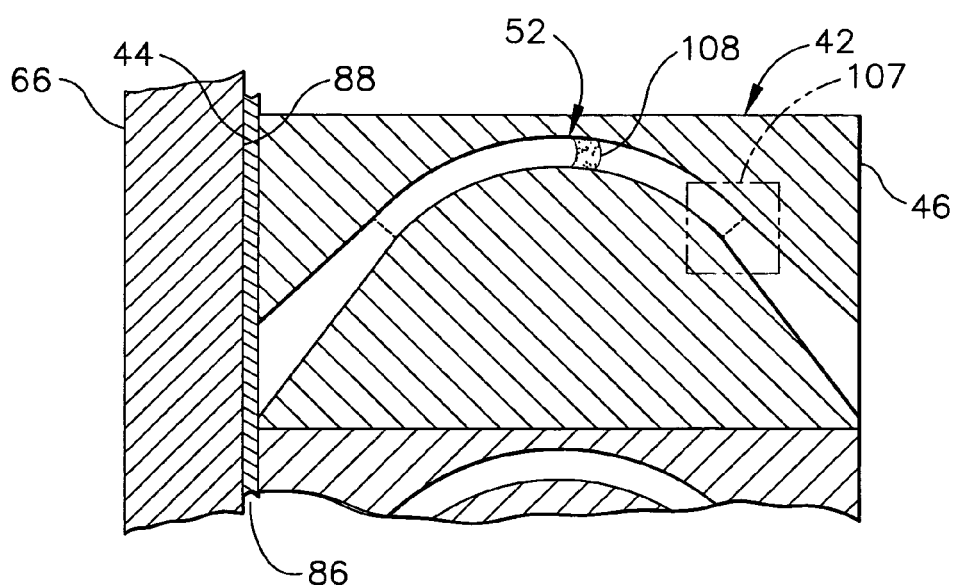

It will be understood that detonation cycles are performed in detonation passages 52 so that combustion gases following detonation waves through detonation passages 52 during such detonation cycles both interface with inner surface 78 of middle portion 58 and exit aft surface 46 of cylindrical member 42 to create a torque that causes cylindrical member 42 to rotate. More specifically, FIGS. 8A–8D represent a preferred sequence of events which takes place according to a predetermined timing. In FIG. 8A, detonation passage 52 is preferably filled with compressed air (indicated by arrow 93) from air port 92, which also serves to purge remaining combustion products from the previous detonation cycle. Next, FIG. 8B depicts the injection of fuel 95 in leading portion 54 of detonation passage 52 via fuel port 94. As seen in FIG. 8C, device 98, located within initiation port 96, preferably initiates detonation of the fuel/air mixture in detonation passage 52 at an initiation point 106 so that a detonation wave 108 is formed. Initiation point 106 is preferably located within leading portion 54 of detonation passage 52 so that detonation wave 108 is formed upstream of midpoint 76 in middle portion 58 and most preferably upstream of transition 63 between leading portion 54 and middle portion 58. Detonation wave 108 then travels through detonation passage 52, as seen in FIG. 8D. Accordingly, combustion gases follow detonation wave 108 through middle portion 58, where they are preferably expanded at a zone 107 located adjacent transition 65 between middle portion 58 and trailing portion 56, and then exhausted out aft surface 46 of cylindrical member 42 to create a torque on cylindrical member 42.

It will be appreciated that prior to the occurrence of any detonation cycles within detonation passages 52, cylindrical member 42 is preferably driven so as to obtain a predetermined rotational speed. This is caused by supplying compressed air to detonation passages 52 via air ports 92 at a relatively higher pressure than the pressure at which air is discharged from detonation passages 52. Once the predetermined rotational speed of cylindrical member 42 is achieved, fuel is then supplied to detonation passages 52 in accordance with the detonation cycle described hereinabove.

It will be appreciated from FIG. 9 that a plurality of port groups 90 may be provided in stator 66, wherein a plurality of detonation cycles are able to occur in each detonation passage 52 during a revolution of cylindrical member 42. Such port groups 90 are preferably spaced symmetrically around stator 66, although it is not required. Moreover, while the number of port groups 90 may be equivalent to the number of detonation passages 52 provided in cylindrical member 42, there may be more or less as desired. In any event, a predetermined amount of circumferential space 109 is provided between each port group 90, as well as between each individual port thereof. Such circumferential spacing may be equivalent to a replaceable segment 61 which does not include a detonation passage therethrough, as in the embodiment depicted in FIG. 9.

Another aspect of pulse detonation system 40 is the manner in which fuel is supplied to fuel ports 94 for injection into detonation passages 52. In one embodiment, a fuel manifold 110 is provided upstream of stator 66 (see FIG. 1). Fuel manifold 110 is preferably in flow communication with a fuel supply (not shown) at one end and is also in flow communication with fuel ports 94 at a second end so that fuel is supplied thereto as part of the detonation cycle in detonation passages 52 described herein. A device 112 is provided to control the injection of fuel from fuel manifold 110.

Figure 10:
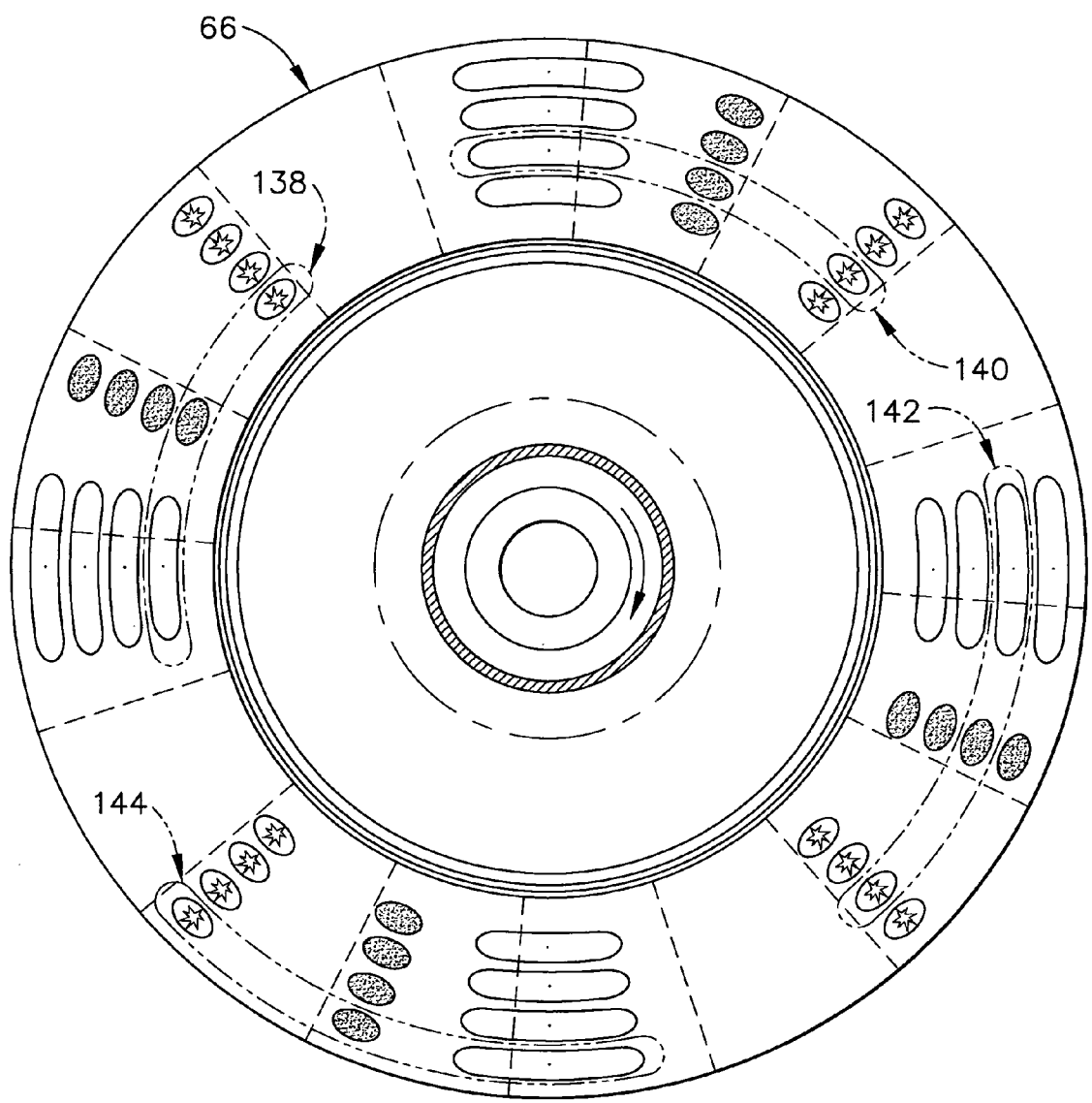
FIG. 10 is a front view of an alternative configuration of the pulse detonation system.
Figure 11:
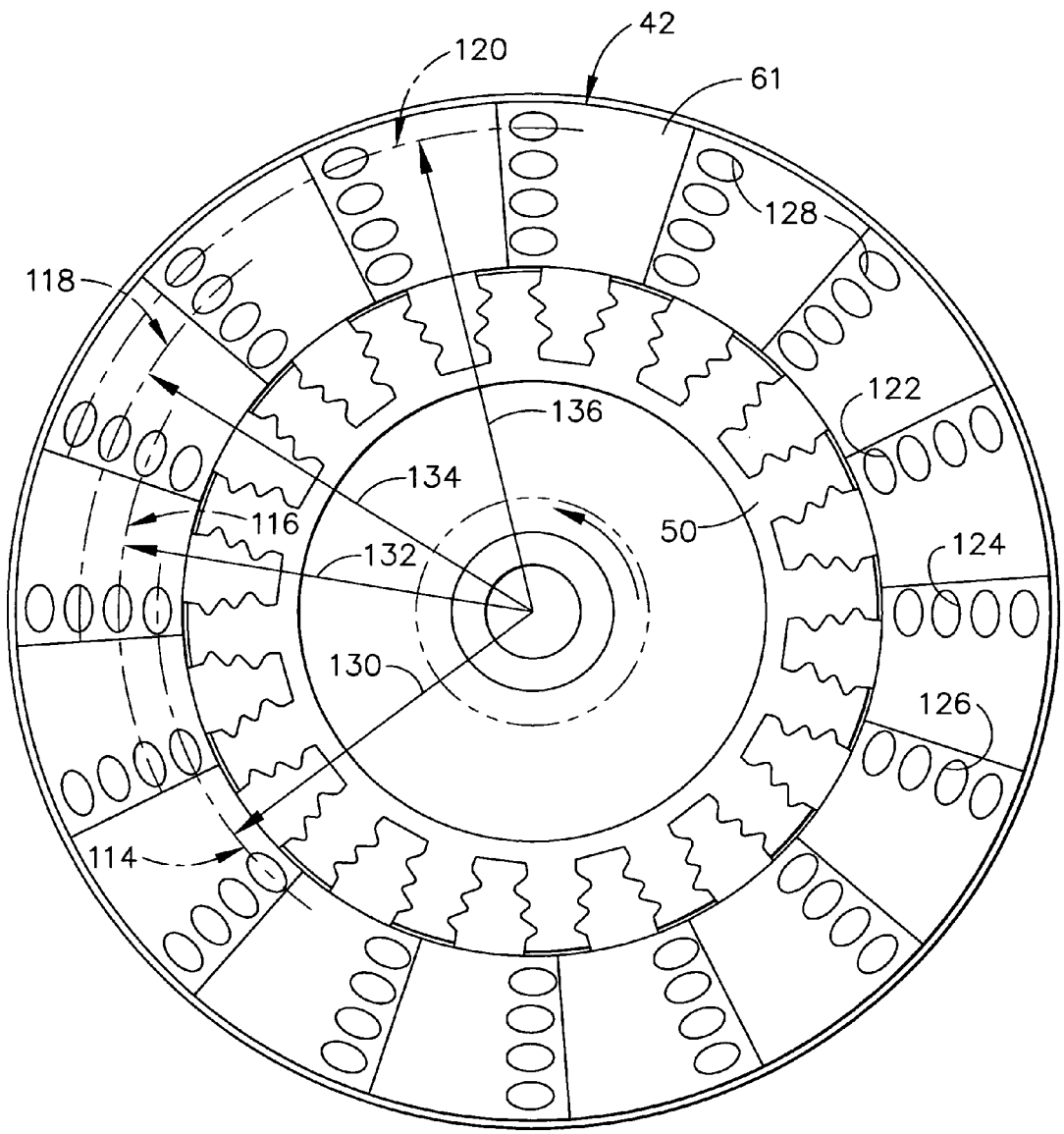
FIG. 11 is a front view of a rotatable cylindrical member for the pulse detonation system depicted in FIG. 10; and, FIG. 12 is a longitudinal schematic sectional view of a second gas turbine engine configuration including a pulse detonation system in accordance with the present invention.

FIGS. 10 and 11 depict an alternative embodiment for pulse detonation system 40, where a plurality of detonation stages 114, 116, 118 and 120 of detonation passages 122, 124, 126 and 128 are radially disposed through cylindrical member 42. Detonation passages 122, 124, 126 and 128 are preferably positioned radially adjacent to each other and are arranged in an annular configuration having distinct radii 130, 132, 134 and 136 (see FIG. 11). As described hereinabove with respect to detonation passage 52, each detonation passage of each detonation stage includes a leading portion located adjacent forward surface 44 of cylindrical member 42, a trailing portion located adjacent aft surface 46 of cylindrical member 42, and a middle portion connecting the leading and trailing portions as described herein.

It is also preferred that detonation passages 122, 124, 126 and 128 be aligned substantially radially and circumferentially in order to simplify construction and the provision of air and fuel thereto. Nevertheless, it will be understood that such detonation passages 122, 124, 126 and 128 may be staggered circumferentially if desired. In either case, the detonation cycles performed in each detonation passage is like that previously described herein. It will also be appreciated from FIG. 10 that stator 66 will preferably include at least one group of ports 138, 140, 142 and 144 formed therein which are preferably positioned so that the velocity vectors of the fuel and air provided therefrom are aligned with the leading portions of detonation passages 122, 124, 126 and 128, respectively, as cylindrical member 42 rotates. It is preferred that such ports be oriented at a designated angle with respect to longitudinal centerline axis 12 as described herein with respect to FIG. 4 and FIGS. 8A–8D. Each port group will preferably include an air port, a fuel port and an initiation port like that described with respect to port group 90.

Figure 12:
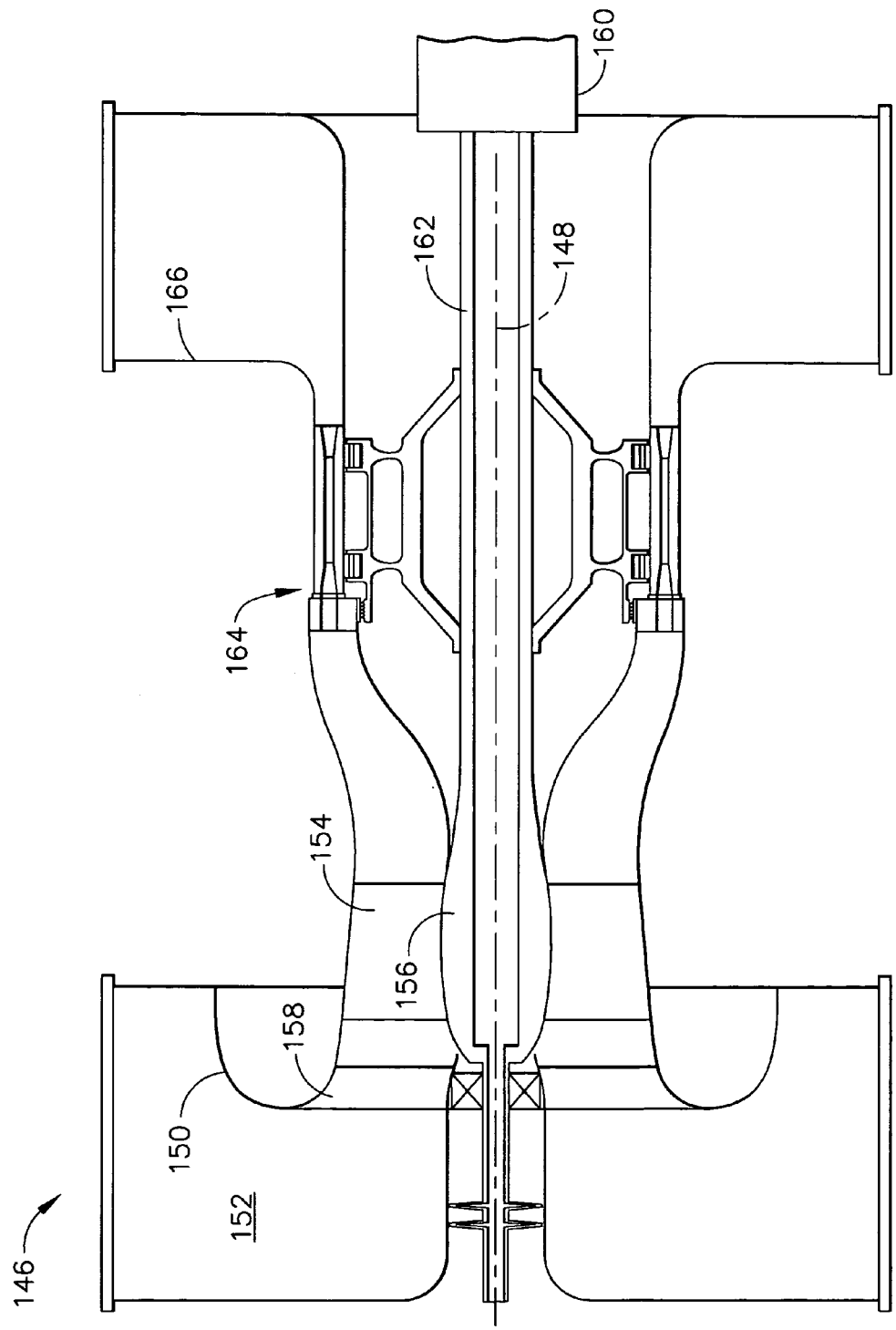

FIG. 12 depicts an alternative gas turbine engine 146 for use in industrial and other shaft power applications (e.g., marine or helicopter propulsion) as having a longitudinal centerline axis 148. As seen therein, gas turbine engine 146 includes a bellmouth 150 at an inlet 152 and a booster compressor 154 positioned downstream of and in flow communication with bellmouth 150. Booster compressor 154 preferably includes at least a first stationary compressor blade row and a second compressor blade row connected to a drive shaft 156 and interdigitated with the first compressor blade row. Additional compressor blade rows may be connected to drive shaft 156, with additional stationary compressor blade rows interdigitated therewith. An inlet guide vane 158 may be positioned at an upstream end of booster compressor 154 to direct the flow of air therein. A load 160 is also connected to drive shaft 156 via a second drive shaft 162. A pulse detonation system 164 like that described hereinabove is provided for powering drive shaft 156, with an exhaust duct 166 being in flow communication with pulse detonation system 164 so that combustion gases are able to exit therefrom.

Having shown and described the preferred embodiment of the present invention, further adaptations of the pulse detonation system can be accomplished by appropriate modifications by one of ordinary skill in the art without departing from the scope of the invention. Moreover, it will be understood that pulse detonation system 40 may be utilized with other types of gas turbine engines not depicted herein.

What is claimed is:

1. A pulse detonation system for a gas turbine engine having a longitudinal centerline axis extending therethrough, comprising:
   (a) a rotatable cylindrical member having a forward surface, an aft surface, and an outer circumferential surface, said cylindrical member including at least one stage of circumferentially spaced detonation passages disposed therethrough, each said detonation passage further comprising:
      (1) a leading portion positioned adjacent said forward surface of said cylindrical member, said leading portion having a centerline therethrough oriented at a designated angle to an axis extending substantially parallel to said longitudinal centerline axis within a specified plane;
      (2) a trailing portion positioned adjacent said aft surface of said cylindrical member, said trailing portion having a centerline therethrough oriented at a designated angle to said axis within said specified plane; and,
      (3) a middle portion connecting said leading and trailing portions, said middle portion having a centerline therethrough with a substantially constantly changing slope in said specified plane;
   (b) a shaft rotatably connected to said cylindrical member; and,
   (c) a stator configured in spaced arrangement with said forward surface of said cylindrical member and a portion of said shaft, said stator including at least one group of ports formed therein alignable with said leading portions of said detonation passages as said cylindrical member rotates;
wherein detonation cycles are performed in said detonation passages so that combustion gases interact therewith to create a torque which causes said cylindrical member to rotate.

2. The pulse detonation system of claim 1, wherein said specified plane is oriented substantially parallel to a tangent of a circumference for said cylindrical member.

3. The pulse detonation system of claim 1, wherein said designated angle of said centerline for said leading portion is in a range of approximately 0° to 75° to said axis.

4. The pulse detonation system of claim 1, wherein said designated angle of said centerline for said trailing portion is in a range of approximately 0° to −75° to said axis.

5. The pulse detonation system of claim 1, wherein said designated angle of said leading portion and said designated angle of said trailing portion have a substantially equal magnitude.

6. The pulse detonation system of claim 1, wherein said designated angle of said leading portion and said designated angle of said trailing portion are oriented on opposite sides of said axis.

7. The pulse detonation system of claim 1, wherein said specified plane is oriented so as to be at a first angle to a first plane extending substantially parallel to a tangent of a circumference for said cylindrical member and at a second angle to a second plane extending substantially radially through said cylindrical member.

8. The pulse detonation system of claim 7, wherein said first angle is in a range of approximately 0° to 75°.

9. The pulse detonation system of claim 7, wherein said second angle is in a range of approximately 0° to 45°.

10. The pulse detonation system of claim 7, said designated angle of said centerline for said leading portion further comprising a first component in a range of approximately 0° to 75° with respect to said axis and a second component in a range of approximately 0° to 45° with respect to said axis.

11. The pulse detonation system of claim 7, said designated angle of said centerline for said trailing portion further comprising a first component in a range of approximately 0° to −75° with respect to said axis and a second component in a range of approximately 0° to −45° with respect to said axis.

12. The pulse detonation system of claim 1, wherein said port groups of said stator are oriented at a designated angle to said longitudinal centerline axis.

13. The pulse detonation system of claim 12, wherein designated angle of said port groups is greater than said designated angle of said leading portion for said detonation passages.

14. The pulse detonation system of claim 12, wherein said port groups are oriented at an angle to said longitudinal centerline axis in a range of approximately 45° to 85°.

15. The pulse detonation system of claim 12, wherein a difference between said designated angle of said port groups and said designated angle of said leading portion is within a range of approximately 10° to 65°.

16. The pulse detonation system of claim 1, further comprising at least one disk connecting said shaft and said rotatable cylindrical member.

17. The pulse detonation system of claim 1, wherein said detonation passages of each detonation stage are symmetrically spaced within said cylindrical member.

18. The pulse detonation system of claim 1, wherein said detonation passages are integral with said cylindrical member.

19. The pulse detonation system of claim 1, wherein said detonation passages are formed in replaceable segments connected to said cylindrical member.

20. The pulse detonation system of claim 1, further comprising a plurality of detonation stages in said cylindrical member.

21. The pulse detonation system of claim 20, said detonation passages of each said detonation stage being arranged in a substantially annular configuration through said cylindrical member having a distinct radius.

22. The pulse detonation system of claim 1, each said group of ports in said stator further comprising an air port in flow communication with a source of compressed air.

23. The pulse detonation system of claim 1, each said group of ports in said stator further comprising a fuel port in flow communication with a fuel source.

24. The pulse detonation system of claim 1, each said group of ports in said stator further comprising a port having a device for initiating a detonation wave associated therewith.

25. The pulse detonation system of claim 1, further comprising a plurality of port groups provided in said stator, wherein a plurality of detonation cycles occur in a predetermined timing and sequence in each said detonation passage during a revolution of said cylindrical member.

26. The pulse detonation system of claim 25, said stator including a predetermined amount of circumferential space between each said port group.

27. The pulse detonation system of claim 1, further comprising a seal plate positioned between said stator and said forward surface of said cylindrical member.

28. The pulse detonation system of claim 1, wherein a cross-sectional area through said detonation passages is substantially constant.

29. The pulse detonation system of claim 1, wherein a cross-sectional area through said leading and trailing portions of said detonation passages is not substantially constant.

30. A gas turbine engine having a longitudinal centerline axis extending therethrough, comprising:
  (a) a fan section at a forward end of said gas turbine engine including at least a first fan blade row connected to a drive shaft;
  (b) a booster compressor positioned downstream of said fan section, said booster compressor including a first compressor blade row and a second compressor blade row connected to said drive shaft and interdigitated with said first compressor blade row; and,
  (c) a pulse detonation system for powering said drive shaft, said pulse detonation system further comprising:
    (1) a rotatable cylindrical member having a forward surface, an aft surface, and an outer circumferential surface, said cylindrical member including at least one detonation stage having a plurality of spaced detonation passages disposed therethrough and being connected to said drive shaft, each said detonation passage further comprising:
      (a) a leading portion positioned adjacent said forward surface of said cylindrical member, said leading portion having a centerline therethrough oriented at a designated angle to an axis extending substantially parallel to said engine longitudinal centerline axis within a specified plane;
      (b) a trailing portion positioned adjacent said aft surface of said cylindrical member, said trailing portion having a centerline therethrough oriented at a designated angle to said axis within said specified plane; and,
      (c) a middle portion connecting said leading and trailing portions, said middle portion having a centerline therethrough with a substantially constantly changing slope in said specified plane; and,
    (2) a stator configured in spaced arrangement with said forward surface of said cylindrical member and a portion of said shaft, said stator including at least one group of ports formed therein alignable with said leading portion of said detonation passages as said cylindrical member rotates;
  wherein detonation cycles are performed in said detonation passages so that combustion gases interface therewith to create a torque which causes said cylindrical member to rotate and power said fan section and said booster compressor.

31. A gas turbine engine having a longitudinal centerline axis extending therethrough, comprising:
  (a) a bellmouth at a forward end of said gas turbine engine;
  (b) a compressor positioned downstream of and in flow communication with said bellmouth, said compressor including a first compressor blade row and a second blade row connected to a drive shaft and interdigitated with said first compressor blade row;

(c) a load connected to said drive shaft; and, (d) a pulse detonation system for powering said drive shaft, said pulse detonation system further comprising:

(1) a rotatable cylindrical member having a forward surface, an aft surface, and an outer circumferential surface, said cylindrical member including at least one detonation stage having a plurality of detonation passages disposed therein and being connected to said drive shaft, each said detonation passage further comprising:

(a) a leading portion positioned adjacent said forward surface of said cylindrical member, said leading portion having a centerline therethrough oriented at a designated angle to an axis extending substantially parallel to said engine longitudinal centerline axis within a specified plane;

(b) a trailing portion positioned adjacent said aft surface of said cylindrical member, said trailing portion having a centerline therethrough oriented at a designated angle to said axis within said specified plane; and, (c) a middle portion connecting said leading and trailing portions, said middle portion having a centerline therethrough with a substantially constantly changing slope in said specified plane;

(2) a stator configured in spaced arrangement to said forward surface of said cylindrical member and a portion of said shaft, said stator including at least one group of ports formed therein alignable with said leading portion of said detonation passages as said cylindrical member rotates;

wherein detonation cycles are performed in said detonation passages so that combustion gases interface therewith to create a torque which causes said cylindrical member to rotate and power said compressor and said load.

* * * * *